(12) United States Patent
Gall

(10) Patent No.: US 6,294,751 B1
(45) Date of Patent: Sep. 25, 2001

(54) METHOD OF ELECTRICALLY WELDING A PART SUCH AS A SCREW OR A BOLT ONTO A BORE IN A COMPOSITE METAL SHEET

(75) Inventor: Patrick Le Gall, Fondettes (FR)

(73) Assignee: ARO (FR)

( * ) Notice: Subject to any disclaimer, the term of this patent is extended or adjusted under 35 U.S.C. 154(b) by 0 days.

(21) Appl. No.: 09/619,093

(22) Filed: Jul. 19, 2000

(30) Foreign Application Priority Data

Jul. 20, 1999 (FR) .................................................... 99 09393

(51) Int. Cl.[7] .............................. B23K 11/10; B23K 11/34
(52) U.S. Cl. ........................ 219/92; 219/107; 219/91.21; 219/91.22
(58) Field of Search ................................ 219/107, 91.21, 219/91.2, 91.22, 92, 117.1

(56) References Cited

U.S. PATENT DOCUMENTS

| | | | |
|---|---|---|---|
| 3,657,509 | * | 4/1972 | Beneteau . |
| 3,666,910 | | 5/1972 | Anderson . |
| 4,020,316 | * | 4/1977 | Schaft et al. . |
| 4,766,283 | * | 8/1988 | McCrovey et al. . |
| 5,248,869 | * | 9/1993 | DeBell et al. . |

FOREIGN PATENT DOCUMENTS

| | | |
|---|---|---|
| 388 486 | 6/1965 | (CH) . |
| 53124142-A | * 10/1978 | (JP) . |
| 360137580-A | * 7/1985 | (JP) . |

* cited by examiner

*Primary Examiner*—Samuel M. Heinrich
*Assistant Examiner*—Colleen P. Cooke
(74) *Attorney, Agent, or Firm*—Riper Marbury Rudnick & Wolfe

(57) ABSTRACT

A method of electrically welding a part such as a bolt around a bore of a composite sheet comprising an intermediate layer of a substantially insulating material disposed between two metal layers. Said sheet is pre-heated in the vicinity of said bore in order to remove said substantially insulating material therefrom, after which said part is welded onto said sheet by a conventional resistance spot welding method. Preferably, said pre-heating operation is conducted by passing an electric current between a counter-electrode applied to the sheet from the same side as said part to be welded, in the vicinity of said bore, and an electrode applied on said part to be welded.

3 Claims, 6 Drawing Sheets

METHOD OF ELECTRICALLY WELDING A PART SUCH AS A SCREW OR A BOLT ONTO A BORE IN A COMPOSITE METAL SHEET

The present invention relates to a method of electrically welding a member or part such as a screw or a bolt around a bore in a composite metal sheet, in situations where this metal sheet has an intermediate layer of substantially insulating material located between two metal layers. Said screw or bolt will preferably be provided with an annular or spherical rib facing the sheet, so as to make the electrical welding easier.

This intermediate layer of substantially insulating material may be a synthetic material, such as a polymer, and the metal layers may be made of low-carbon steel, for example used to make housings for engines. The thicknesses of said layers may be in the order of $5/100$ of a mm in the case of the polymer, which in this case is therefore a very fine film, and $7/10$ of a mm in the case of the metal. Such sheets are commonly known as MPM sheets.

A problem arises when the heads of screws or bolts have to be welded onto such sheets using a conventional resistance spot welding method because the sheet is clamped between two electrodes with the part to be welded placed in between: current is not able to pass between the layers of metal if the polymer film affords total insulation between them, whereas if this is not the case, the abrupt increase in the temperature of the sheet around the bore will cause an explosion due to sudden evaporation of the polymer, which can pierce the sheet under certain circumstances.

Furthermore, if low intensities are applied by flat electrodes clamped onto a single MPM sheet for long welding times, the current passes through at different points in a random manner, giving rise to random visible heat spots moving around the surface, which do not follow the direction of the electrodes and do not systematically start at the edges of the sheets, bringing to light the internal defects of the MPM sheet, which is not totally satisfactory.

The objective of this invention is to remedy the disadvantages inherent in the prior art and, to this end, the invention proposes a method of the type outlined above which is characterised in that said sheet is pre-heated in the vicinity of said bore in order to remove said substantially insulating material therefrom, after which a conventional resistance spot welding operation is performed on said part on said sheet.

In the case of certain parts, in particular heads of screws with a relatively small diameter, said pre-heating operation can be applied by passing an electric current between a counter-electrode applied to the sheet from the same side as said part, in the vicinity of said bore, and an electrode applied either to said part to be welded, or on a particular contact member taking the place thereof, if it is wanted to avoid any risk of deterioration of the part to be welded during the pre-heating step.

This counter-electrode may be applied to the sheet non-symmetrically relative to the bore.

In the case of other parts, for example bolts with a relatively large diameter, on the contrary, it is of advantage if said counter-electrode is annular and completely surrounds said part to be welded or said particular contact member in rotational symmetry so that heat is applied uniformly to the sheet around the bore.

Some embodiments of the invention will now be described as not restrictive examples, with reference to the appended drawings of which:

Figure 1:
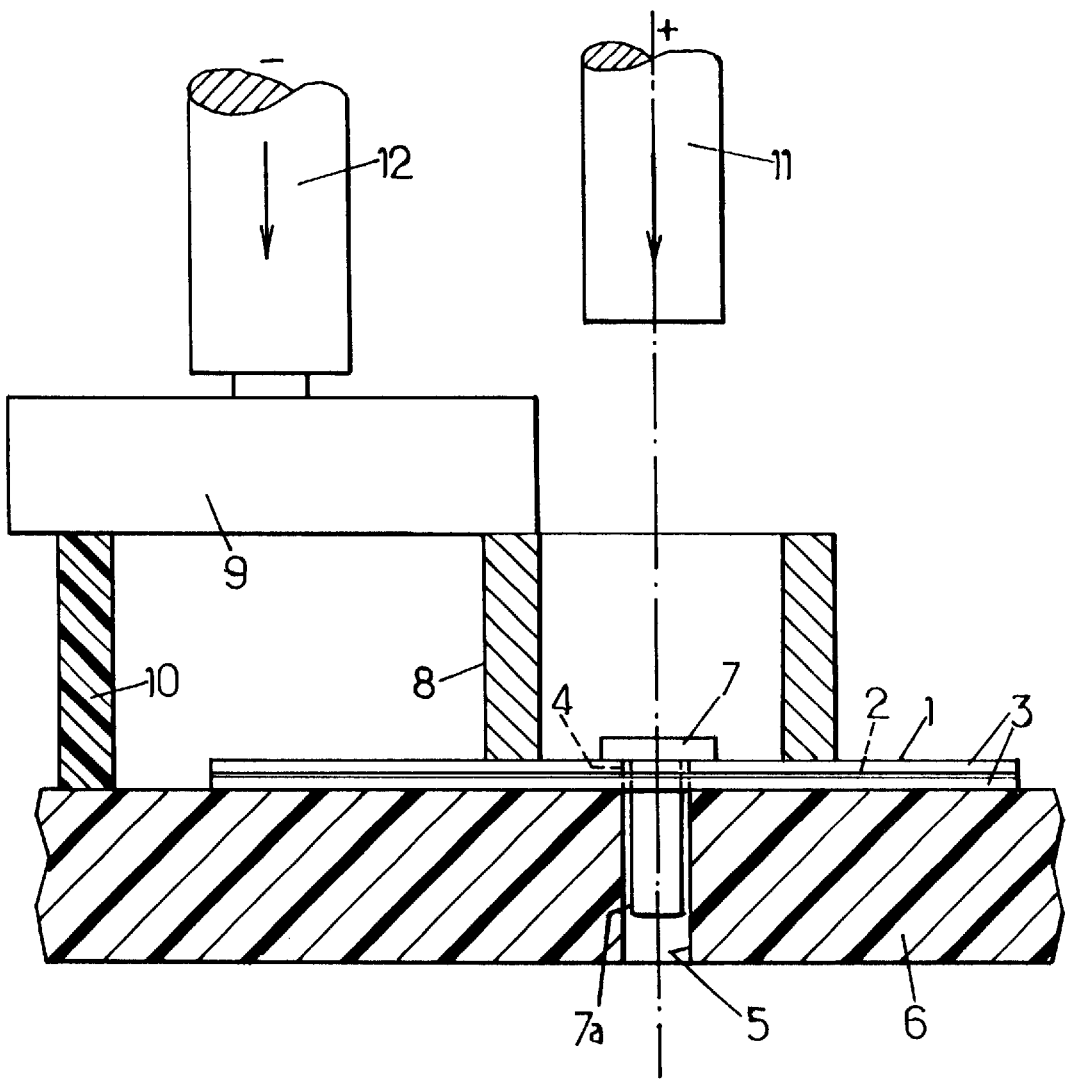
FIG. 1 is a schematic view of the pre-heating step where the part to be welded onto the sheet is a screw with a relatively small diameter.

In FIG. 1, reference 1 is a MPM sheet including a polymer insulating intermediate layer 2 located between two metal layers 3, the respective thicknesses of which can be approximately the same than those which have been above mentioned. A bore 4 in said sheet is aligned with a bore 5 in an insulating support on which the sheet rests. A screw 7 having a substantially small diameter has its threaded portion 7a engaged through the bore 5, and its head resting on the upper surface of the sheet 1. On said surface, an annular counter-electrode is applied. A metal pressing member 9 rests, on one hand, on said counter-electrode and, on another hand, on an insulating post 10 which rests on the insulating support 6.

An electrode 11 of a welding machine, which is connected for example to the positive terminal of a pre-heating current supplying source, is then applied on the head of the screw 7, when another electrode 12, which is connected to the negative terminal of said source, is applied on the metal pressing member 9, whereby ohmic heating provides a fast, but not sudden suppression of the polymer 2 in the zone which surrounds the screw head, without any risk of deterioration the sheet 1.

When said pre-heating step is ended, the insulating support 6 is withdrawn and under the sheet 1, around the threaded portion 7a of the screw, a standard annular welding electrode is disposed which, with cooperation with the above mentioned electrode 11, will allow to weld electrically the screw head on the sheet 1, due to the fact the current can now flow between both metal sheets 3.

Figure 2:
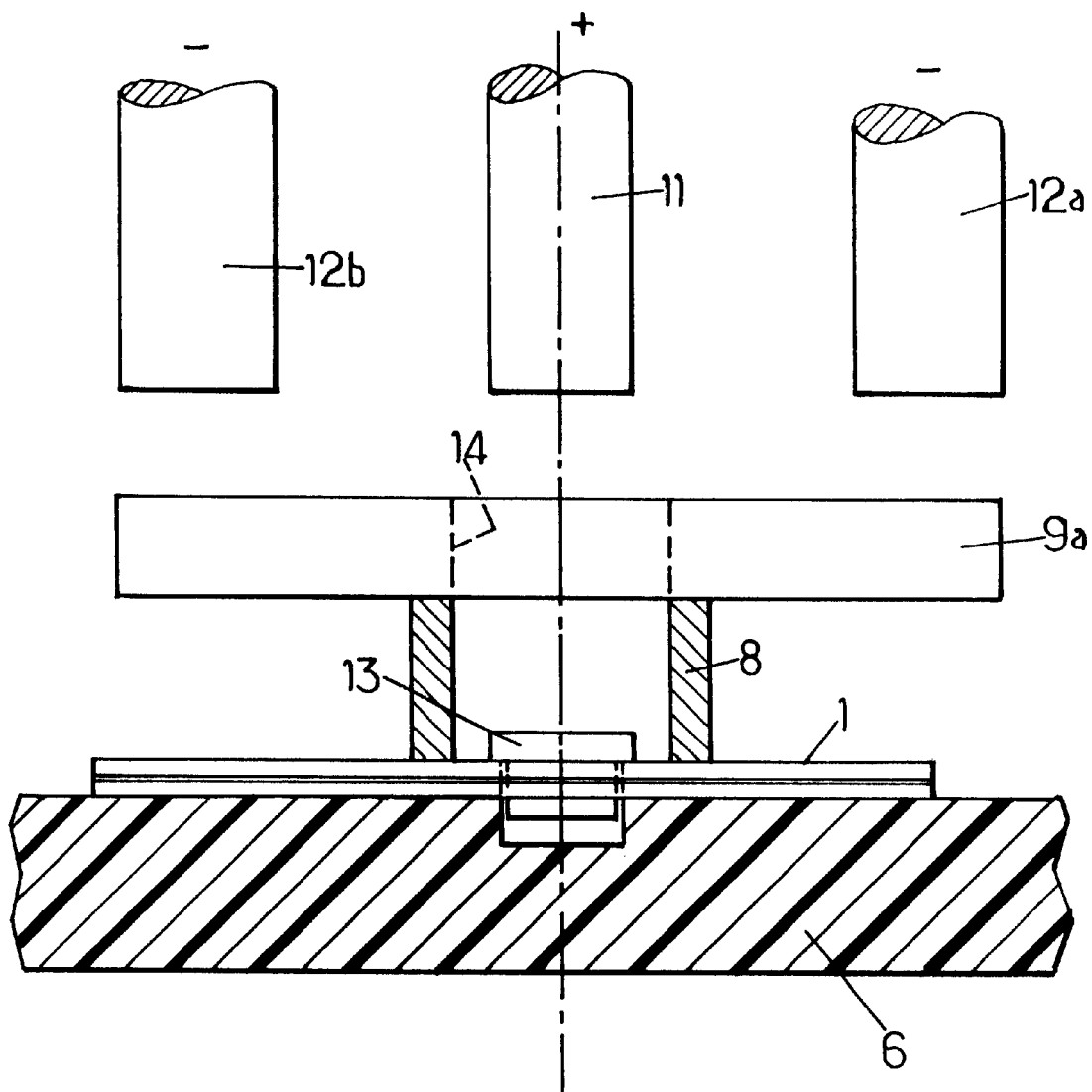
FIG. 2 is a schematic view of the pre-heating step where the part to be welded onto the sheet is a bolt with a relatively large diameter.

In the application shown at FIG. 2, it has been supposed that a part having a substantially large diameter, such as a bolt 13, was to be welded on the sheet 1. In such a case, it may be of advantage to replace the metal pressing member 9 with an annular metal member 9a provided with a bore 14 and the periphery of the bore of which is applied on the annular counter-electrode 8. The pre-heating is then provided by applying the positive electrode 11 on the bolt 13 and two negative electrodes 12a and 12b on the periphery of the annular member 9a; as above, the flow of the electrical current around the bolt 13 causes the polymer film to be removed due to the ohmic effect, without any risk of deterioration of the sheet 1. Then, the welding step is conducted as known, after the insulating support having been removed.

It will be noted that, if a risk of deterioration of the part 7 or 13 to be welded must be avoided, it may be replaced, during the pre-heating step, with a specific contact member lying at the same place than the part to be welded.

Figure 3:
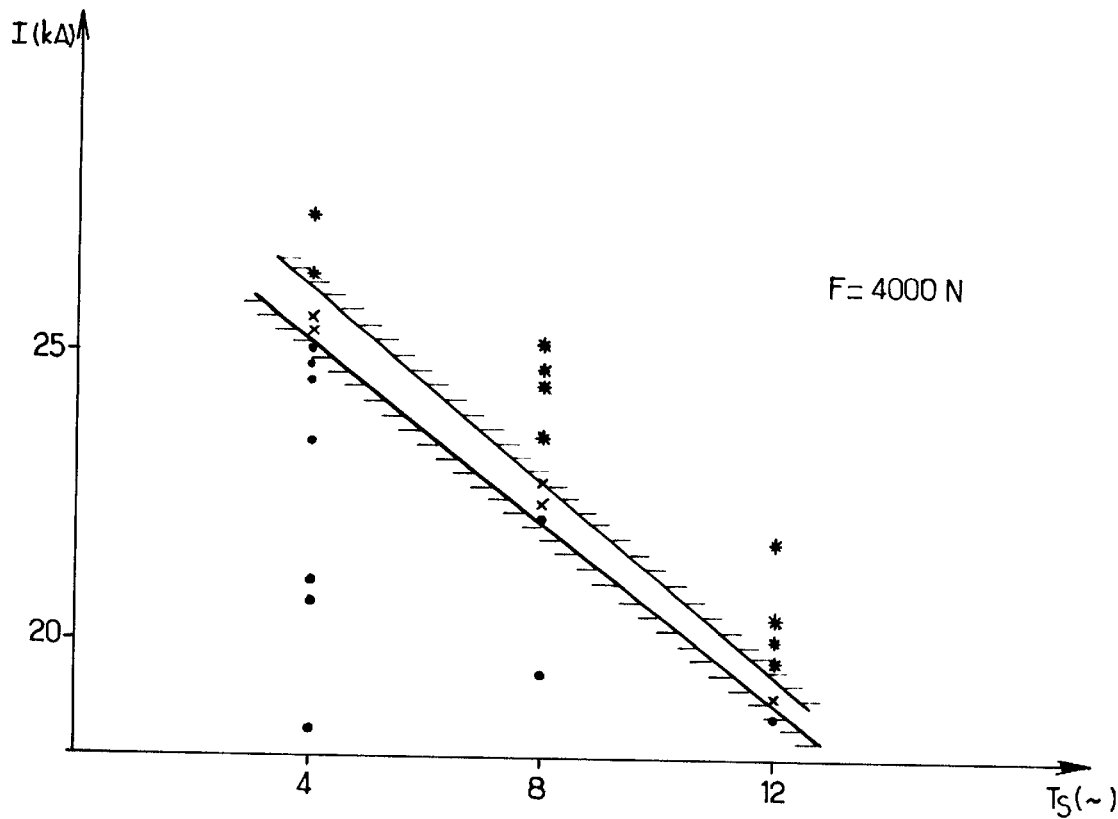
FIGS. 3 and 4 are graphs showing, by way of reference, the possibilities for welding screw heads using an alternating current welder at pressures of 400 daN and 600 daN respectively between electrodes, on one or two layers of bare sheet, the welding time (in current periods) being plotted on the abscissa and the welding current (in kVA) as ordinates.
Figure 4:
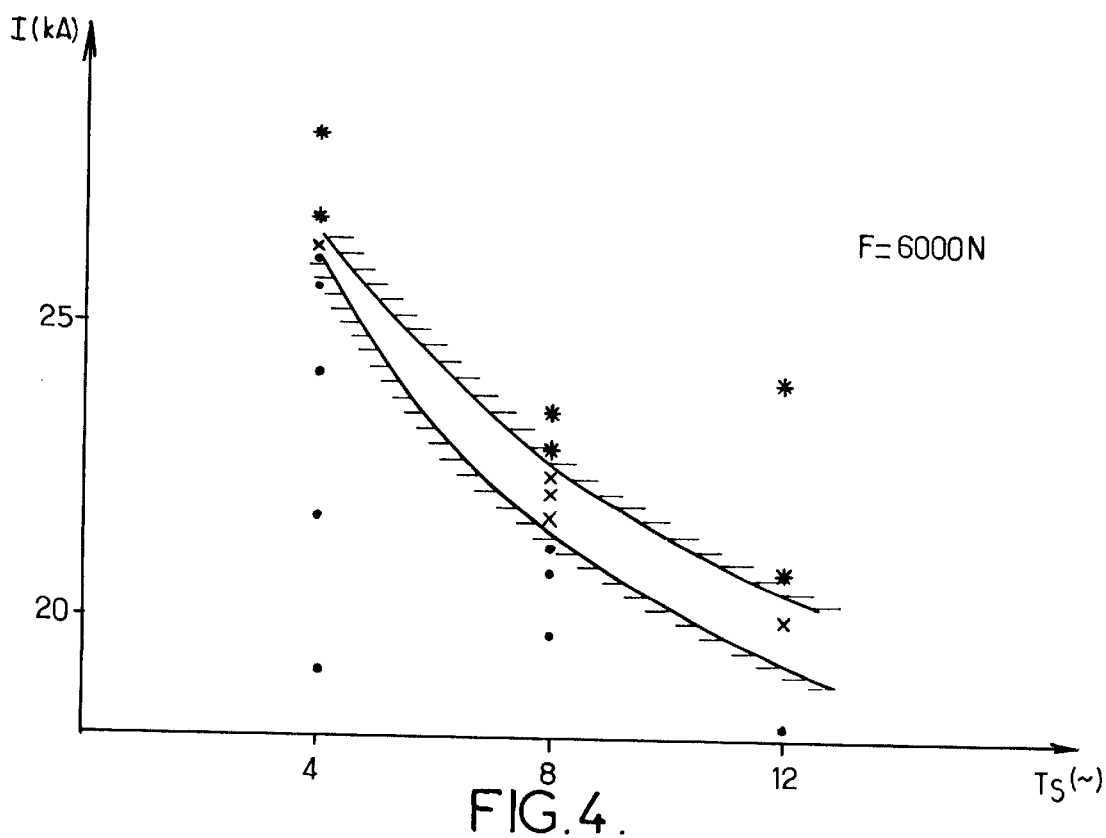

In FIGS. 3 and 4, the parameters and weldability zones of a screw head on one layer of bare sheet are represented by dots for a welding time of 4, 8 and 12 periods and by crosses for the same periods on two layers of such a sheet. As may be seen, the welding area is substantially large for a single layer whereas the welding area of the two layers is substantially limited, and is so at pressures of 400 daN (FIG. 3) and 600 daN (FIG. 4) between electrodes. However, the flash over limit, represented by asterisks, is approximately in the same order of size under both pressures.

Figure 5:
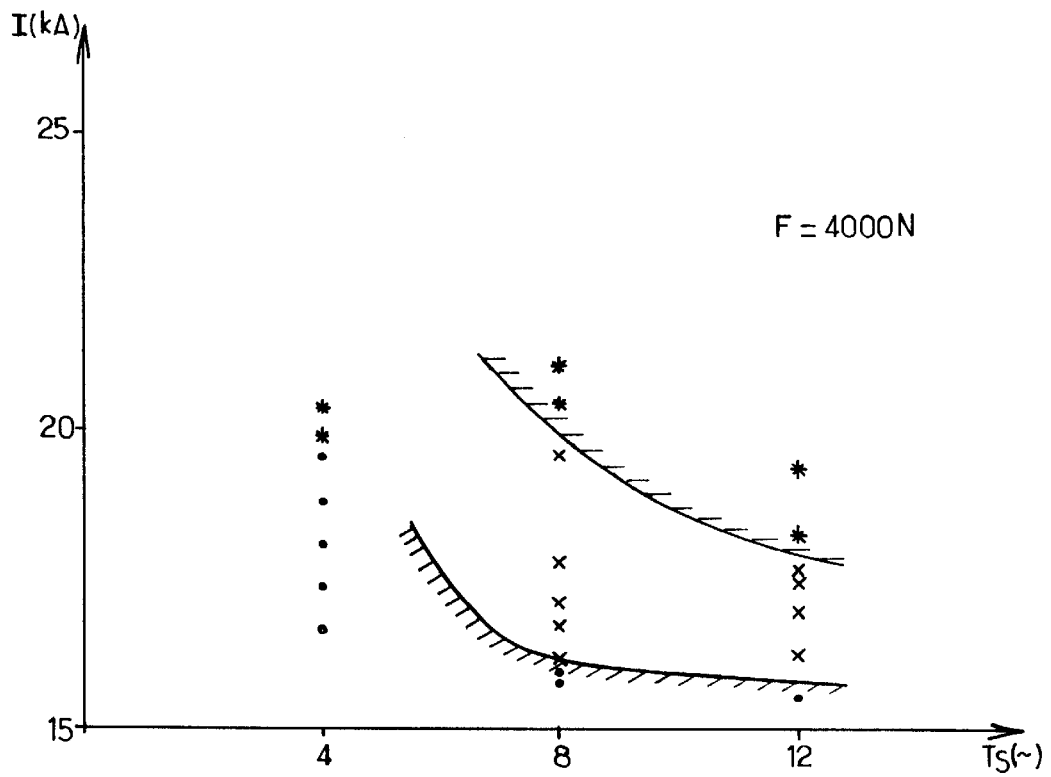
FIGS. 5 and 6 are graphs of the same type for the same pressures and welding times when welding screw heads onto pre-heated MPM sheets according to the invention.
Figure 6:
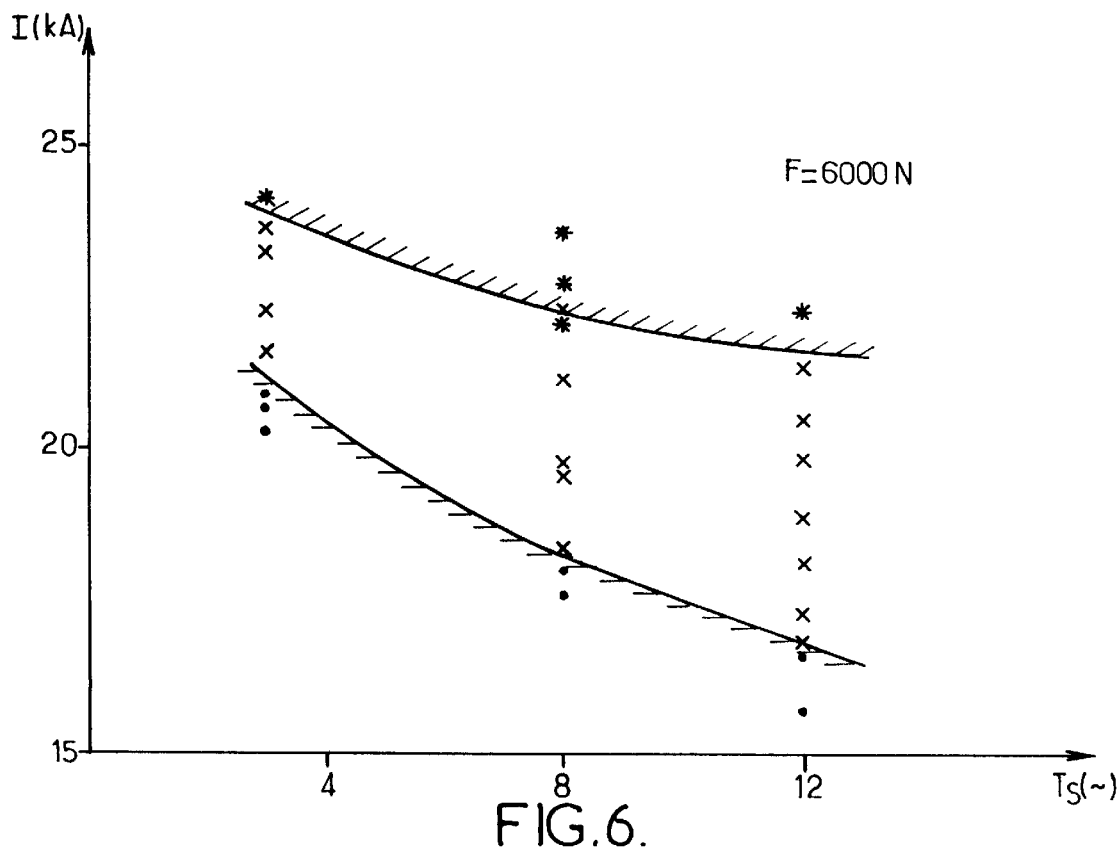

After pre-heating and under the same pressures, 400 daN and 600 daN respectively (FIGS. 5 and 6), a shift is observed towards lower welding intensities, below 20000 A, and a larger area in which the two layers can be welded before projections. Welding at 600 daN produces a larger welding area in the two layers than at 400 daN.

Figure 7:
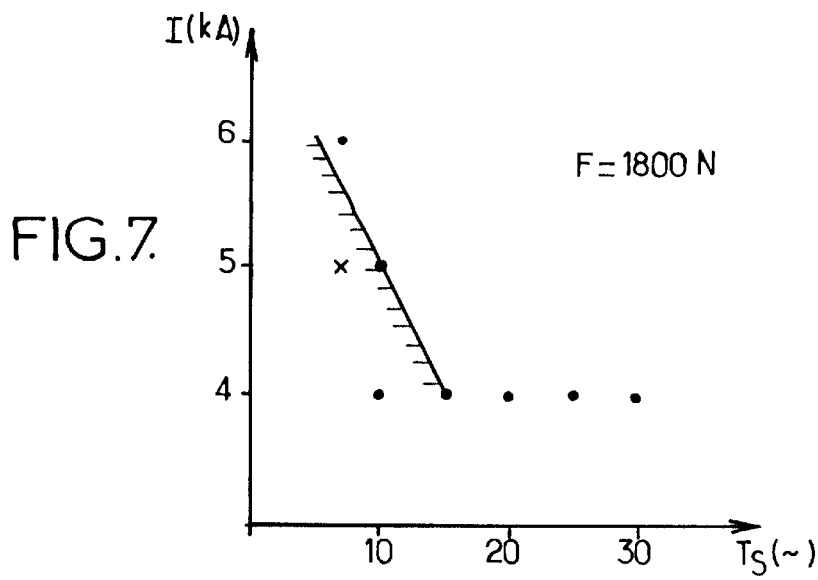
FIG. 7 is a graph of the same type showing the effect of varying the intensity of the pre-heating when welding a screw under a pressure of 180 daN.

In the graph shown in FIG. 7, the pre-heating intensity and its duration have been modified, but the pressure remains unchanged at 180 daN. The curve gives the parameters leading to an open pre-heating for the welding to be conducted. It may be noted that the pre-heating time car be reduced without adversely affecting welding: it was possible to peel off the welded MPM sheets with the two layers welded.

Figure 8:
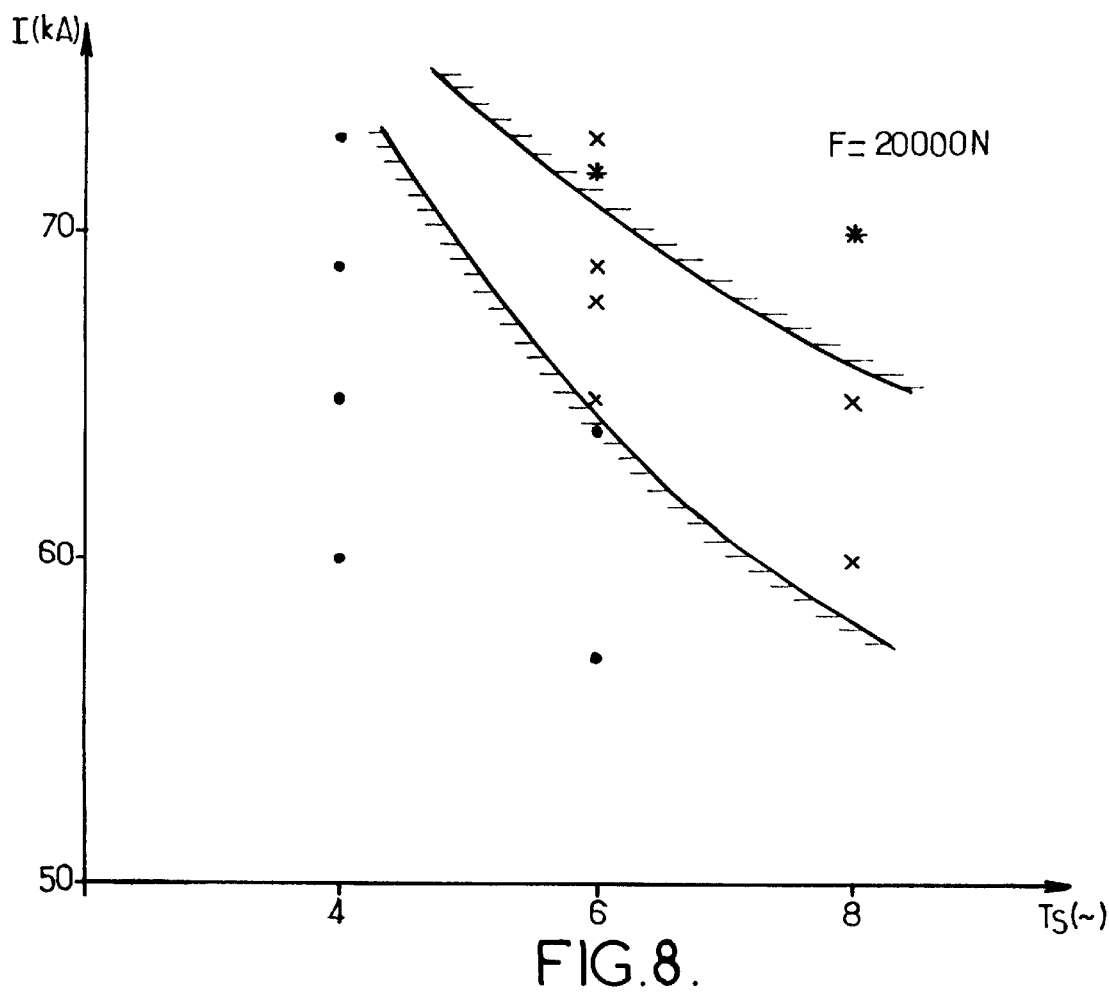
FIG. 8 is a graph of the same type as those shown in FIGS. 3 to 6, showing the possibilities of welding a bolt with a relatively large diameter under a pressure of 2000 daN.

Finally, FIG. 8 shows the adjustments applied when welding, after pre-heating, a bolt with a substantially large diameter under a pressure of 2000 daN.

In FIGS. 3 to 6 and 8, the area of points represents a sticking, the area of crosses represents a welding of the both sheet layers, and the area of asterisks represents an ejection.

Figure 9:
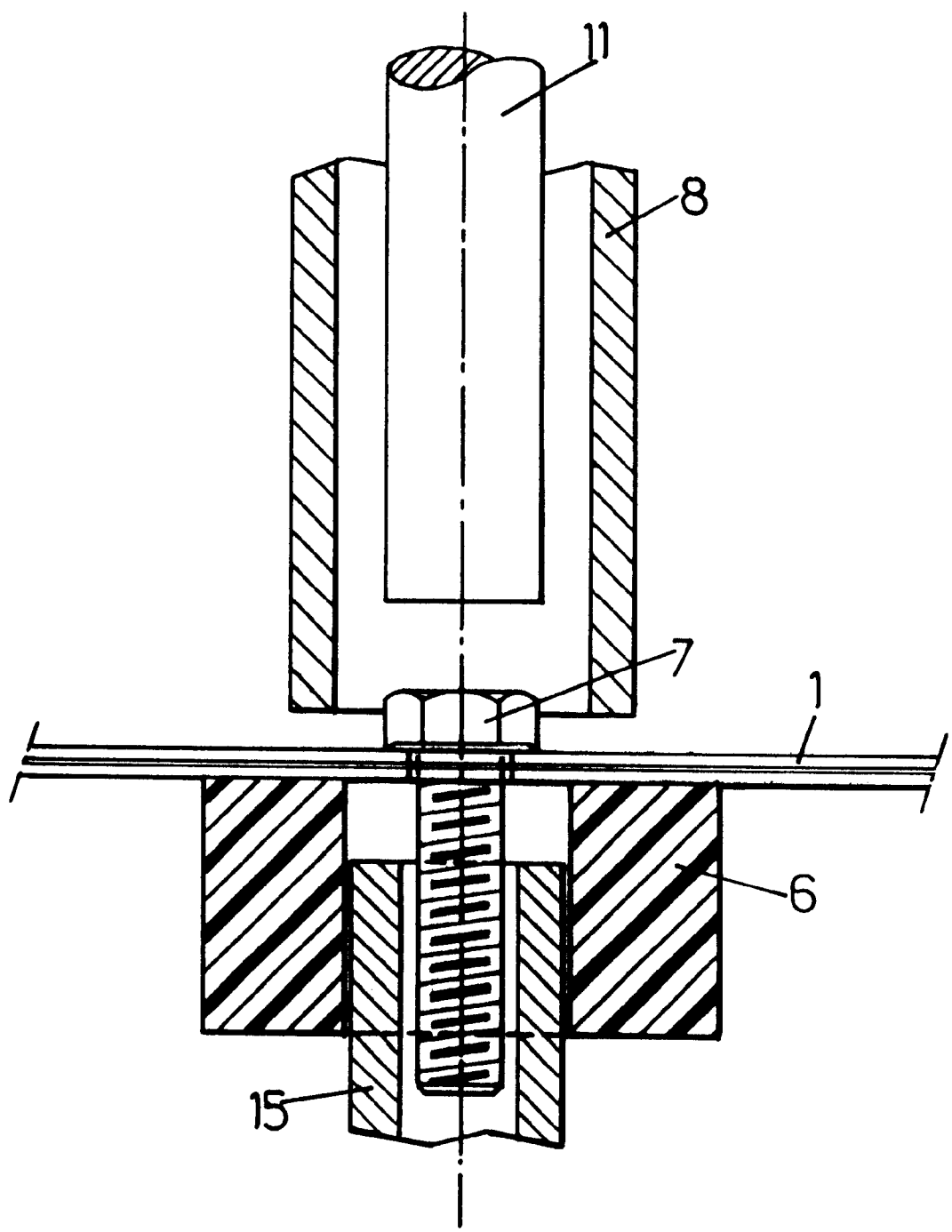
FIG. 9 is an axial section view of a variant.

As shown in FIG. 9, it is also possible to prepare parts with a pre-heating in false double-points and then to weld them with a single step: at the beginning, under a lower pressure, an upper concentric electrode 11 is used for the pre-heating, then the external tubular electrode 8 is lifted, and a welding electrode 15 is disposed under the part to be welded.

What is claimed is:

1. A method of electrically welding a part around a bore of a composite sheet comprising an intermediate layer of a substantially insulating material disposed between two metal layers, characterised in that said sheet is pre-heated in the vicinity of said bore in order to remove said substantially insulating material therefrom, after which said part is welded onto said sheet by a conventional resistance spot welding method.

2. A method as claimed in claim 1, characterised in that said pre-heating operation is conducted by passing an electric current between a counter-electrode applied to the sheet from the same side as said part to be welded, in the vicinity of said bore, and an electrode applied either on said part to be welded, or on a specific contact member taking the place thereof.

3. A method as claimed in claim 2, characterised in that said counter-electrode is annular and completely surrounds said part to be welded or said specific contact member.

* * * * *